US012766835B2

(12) United States Patent
Watanabe et al.

(10) Patent No.: US 12,766,835 B2
(45) Date of Patent: Oct. 20, 2026

(54) PIEZOELECTRIC ACTUATOR AND LIQUID EJECTION HEAD

(71) Applicant: CANON KABUSHIKI KAISHA, Tokyo (JP)

(72) Inventors: Shinichiro Watanabe, Kanagawa (JP); Takashi Ikeda, Kanagawa (JP); Shogo Tazawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 138 days.

(21) Appl. No.: 18/639,254

(22) Filed: Apr. 18, 2024

(65) Prior Publication Data

US 2024/0351332 A1 Oct. 24, 2024

(30) Foreign Application Priority Data

Apr. 20, 2023 (JP) ................................ 2023-069080

(51) Int. Cl.
*B41J 2/14* (2006.01)

(52) U.S. Cl.
CPC ........ *B41J 2/14233* (2013.01); *B41J 2/14201* (2013.01); *B41J 2002/14241* (2013.01); *B41J 2002/14491* (2013.01)

(58) Field of Classification Search
CPC ................ B41J 2/14233; B41J 2/14201; B41J 2002/14241; B41J 2002/14491
See application file for complete search history.

(56) References Cited

U.S. PATENT DOCUMENTS

2012/0236083 A1* 9/2012 Mizukami .............. B41J 2/1612
347/70
2023/0264474 A1* 8/2023 Kurokawa ............. B41J 2/1623

FOREIGN PATENT DOCUMENTS

JP 2020025082 A 2/2020

* cited by examiner

*Primary Examiner* — Geoffrey S Mruk
(74) *Attorney, Agent, or Firm* — Canon U.S.A., Inc. IP Division

(57) ABSTRACT

A piezoelectric actuator includes a piezoelectric element including a first electrode, a piezoelectric layer, and a second electrode arranged in this order from a substrate, a first wiring electrically connected to the first electrode, a second wiring electrically connected to the second electrode, a first layer covering the piezoelectric element, a second layer arranged between the piezoelectric element and the first wiring and between the piezoelectric element and the second wiring, and a third layer arranged to cover the first wiring, the second wiring, and a periphery of the piezoelectric layer when viewed from a direction perpendicular to a surface of the substrate, wherein the first layer, the second layer, and the third layer are arranged in this order from the substrate, and wherein the third layer has higher moisture resistance than the second layer.

17 Claims, 15 Drawing Sheets

PIEZOELECTRIC ACTUATOR AND LIQUID EJECTION HEAD

BACKGROUND

Field of the Disclosure

The present disclosure relates to a piezoelectric actuator and a liquid ejection head.

Description of the Related Art

A piezoelectric body whose shape is changed by application of an electric field is applied to various industrial products as a means for minutely and accurately moving or vibrating an object. For example, the piezoelectric body is used in a small speaker, a hard disk drive, a printer (liquid ejection apparatus), or the like.

Among such applications, there are some printers that employ a piezoelectric layer in a liquid ejection head that ejects liquid droplets. In such a liquid ejection head, an electric field is applied by electrodes (upper electrode and lower electrode) formed so as to sandwich the piezoelectric layer from above and below, so that the piezoelectric layer is driven to eject liquid droplets. At this time, a voltage required to sufficiently displace the piezoelectric layer is several tens of volts, and a relatively high voltage as a semiconductor device is to be applied. In addition, in order to perform high-definition recording, wirings and electrodes having different potentials are densely arranged in the liquid ejection head.

In such a liquid ejection head including a piezoelectric actuator including a piezoelectric layer, a deterioration in characteristics of the piezoelectric layer due to moisture in a high humidity environment, or a dielectric breakdown or a failure due to an increase in leakage current, may occur.

Japanese Patent Application Laid-Open No. 2020-25082 discloses a liquid ejection head capable of maintaining electromechanical conversion characteristics of a piezoelectric layer even in a high humidity environment. In Japanese Patent Application Laid-Open No. 2020-25082, a pair of electrodes (upper electrode and lower electrode) sandwiching a piezoelectric layer from above and below are provided, and an insulating layer is provided between an upper wiring connected to the upper electrode and the piezoelectric body, between the lower electrode and the upper wiring, and between a lower wiring connected to the lower electrode and the lower electrode. In addition, an amount of excessive lead in the piezoelectric layer, which is a source of leakage, is adjusted to control the leakage current. The liquid ejection head is disclosed as being capable of suppressing a density of the leakage current of the piezoelectric layer to $4.2\times10^{-6}$ $A/cm^2$ or less by adopting such a configuration.

A surface of aluminum oxide used as the insulating layer in the configuration disclosed in Japanese Patent Application Laid-Open No. 2020-25082 is altered when exposed to moisture in a high temperature state. In a case where etching is performed to form a contact hole and wiring in a state where an aluminum oxide film is on an outermost surface of a piezoelectric actuator, the surface of the aluminum oxide film may be exposed to moisture in a cleaning step or the like. At this time, the moisture remaining on the film surface may be heated to a high temperature during etching or ashing, which may cause the aluminum oxide film surface to be altered. The presence of the altered insulating layer on the piezoelectric layer may lead to a deterioration in dielectric strength and may cause a failure.

Further, when the insulating layer in the piezoelectric actuator is only the aluminum oxide film, it is necessary to increase the film thickness of the aluminum oxide film in order to obtain sufficient dielectric strength, which may lead to a decrease in displacement characteristics of the piezoelectric actuator.

SUMMARY

Therefore, some embodiments of the present disclosure are directed to providing a piezoelectric actuator having both good piezoelectric characteristics and high reliability in preventing a deterioration in dielectric strength and a failure.

According to an aspect of the present disclosure, a piezoelectric actuator includes a piezoelectric element including a first electrode, a piezoelectric layer, and a second electrode arranged in this order from a substrate, a first wiring electrically connected to the first electrode, a second wiring electrically connected to the second electrode, a first layer covering the piezoelectric element, a second layer arranged between the piezoelectric element and the first wiring and between the piezoelectric element and the second wiring, and a third layer arranged to cover the first wiring, the second wiring, and a periphery of the piezoelectric layer when viewed from a direction perpendicular to a surface of the substrate, wherein the first layer, the second layer, and the third layer are arranged in this order from the substrate, and wherein the third layer has higher moisture resistance than the second layer.

Further features of various embodiments will become apparent from the following description of exemplary embodiments with reference to the attached drawings.

DESCRIPTION OF THE EMBODIMENTS

Figure 1:
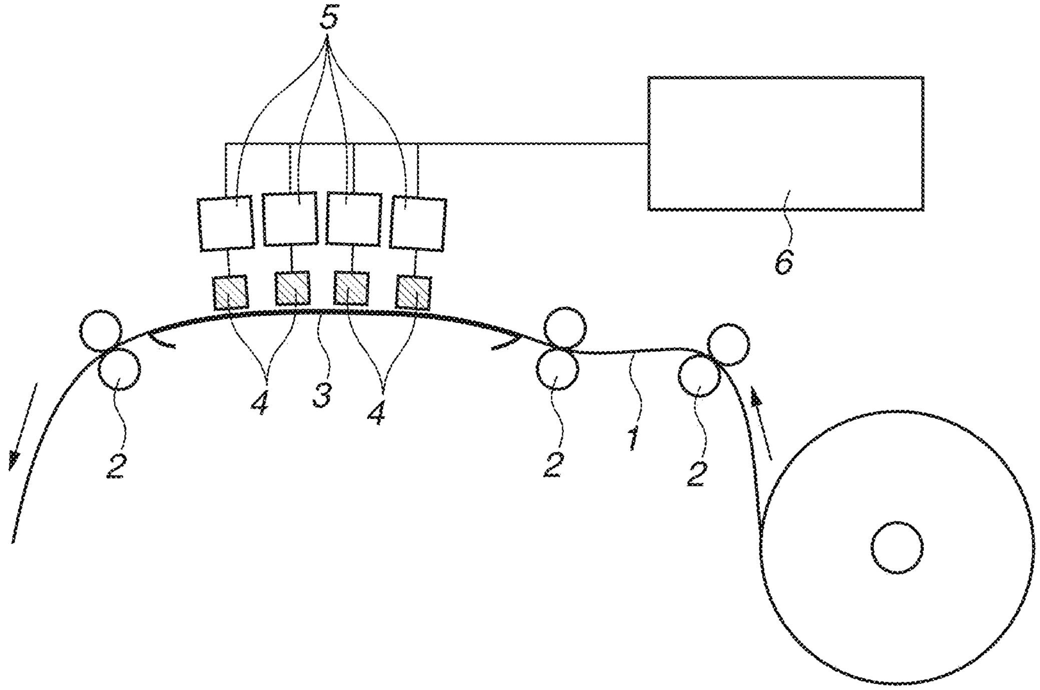
FIG. 1 is a diagram illustrating an example of a liquid ejection apparatus of the present disclosure.

Exemplary embodiments of the present disclosure will be described with reference to the drawings. The same reference numerals are given to components having the same functions, and the repetition of descriptions may be omitted. In the following descriptions, an example in which the present disclosure is applied to a piezoelectric actuator used in a liquid ejection head provided in an ink jet printer as a liquid ejection apparatus will be described. However, application of the present disclosure is not limited to the exemplary embodiments described below, and the present disclosure can also be applied to other embodiments. Further, the exemplary embodiments described below can be changed, such as by additions, modifications, deletions, and the like, within the scope that can be conceived by those skilled in the art. Any aspect is included in the scope of the present disclosure as long as the effects and advantages of the present disclosure are achieved.

<Liquid Ejection Apparatus>

FIG. 1 is a diagram illustrating an example of a configuration of a liquid ejection apparatus. A recording medium 1, such as recording paper, is fed in a direction of arrows by conveying units 2, such as paper feed rollers, and recording is performed on a platen 3. The apparatus includes four liquid ejection heads 4 that respectively eject cyan, magenta, yellow, and black inks to perform recording. Each of the liquid ejection heads 4 is connected to a driving unit 5 that electrically drives a pressure generating unit of the liquid ejection head 4. The driving unit 5 generates a driving signal based on an image signal or the like transmitted from a controller 6.

Figure 2:
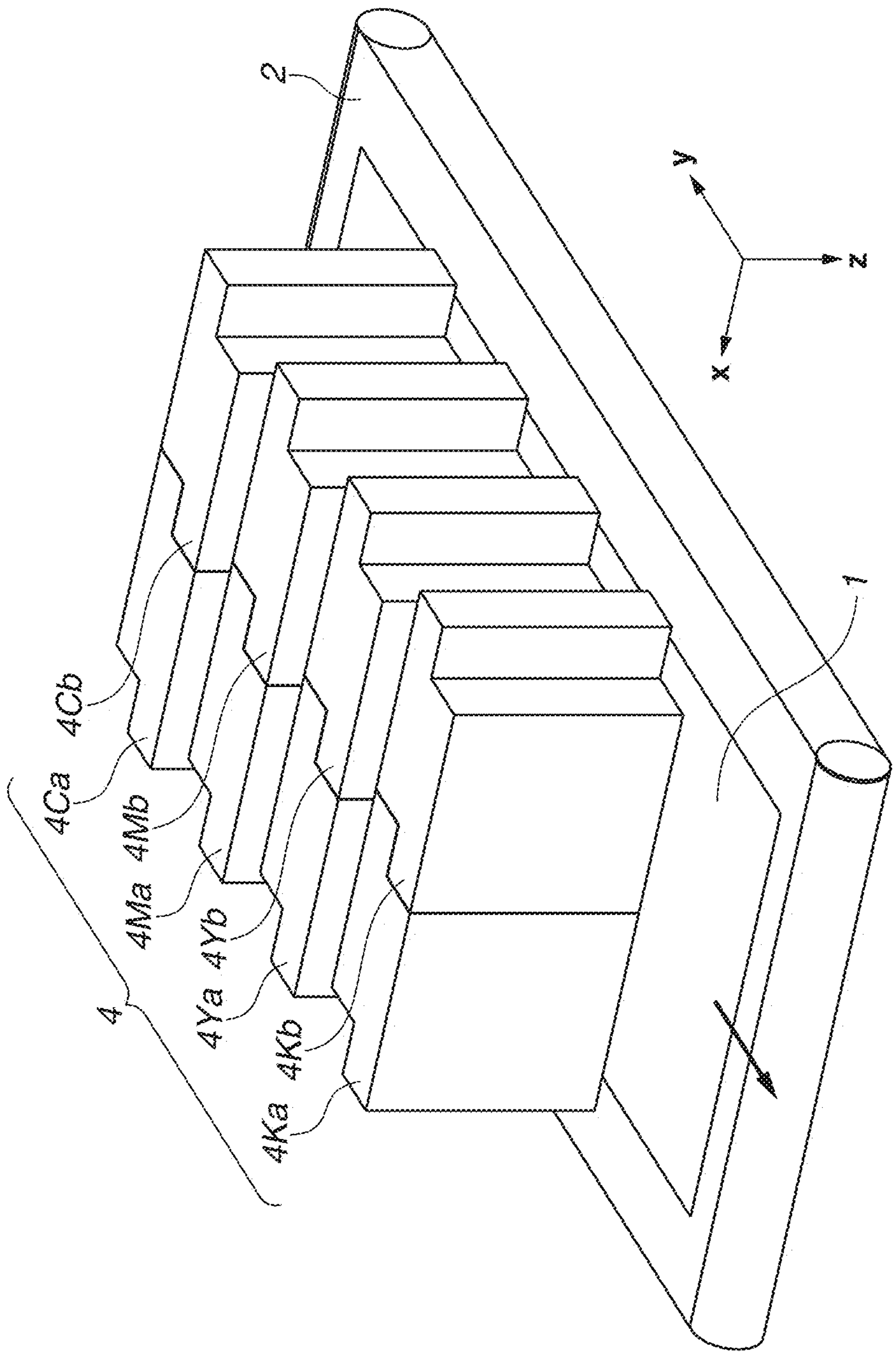
FIG. 2 is a diagram illustrating an example of the liquid ejection apparatus of the present disclosure.

FIG. 2 is another diagram illustrating an example of the configuration of the liquid ejection apparatus. The liquid ejection apparatus illustrated in FIG. 2 is a one-pass type apparatus that records an image in a single movement of the recording medium 1. The liquid ejection apparatus (hereinafter, also referred to as an apparatus main body) includes a full-line head liquid ejection head in which element substrates having ejection ports for ejecting liquid are arranged over a side corresponding to the full width of the recording medium 1. The recording medium 1 is conveyed in a direction of an arrow by the conveying units 2, and recording is performed by the liquid ejection heads 4. The liquid ejection heads 4 according to the present disclosure can be implemented in any form including the exemplary forms illustrated in FIGS. 1 and 2, and other forms are not excluded. FIG. 2 illustrates the liquid ejection apparatus equipped with eight liquid ejection heads 4 (4Ka, 4Kb, 4Ya, 4Yb, 4Ma, 4Mb, 4Ca, and 4Cb). These eight liquid ejection heads 4 are positioned in the liquid ejection apparatus by a reference member.

As described above, the liquid ejection head according to a first exemplary embodiment is a page-wide type head of the one-pass type having a length corresponding to the width of the recording medium 1 (the size in a direction orthogonal to a conveyance direction of the recording medium 1). However, the present disclosure can also be applied to a serial type liquid ejection head that performs recording while scanning the liquid ejection head with respect to a recording medium. The serial type liquid ejection head may have a configuration in which one element substrate for black ink and one element substrate for color ink are mounted thereon. As another example, a liquid ejection head may be configured such that a plurality of element substrates is arranged in an ejection port array direction so that the ejection ports overlap each other, and such that the width of the liquid ejection head is shorter than the width of the recording medium 1.

Figure 3:
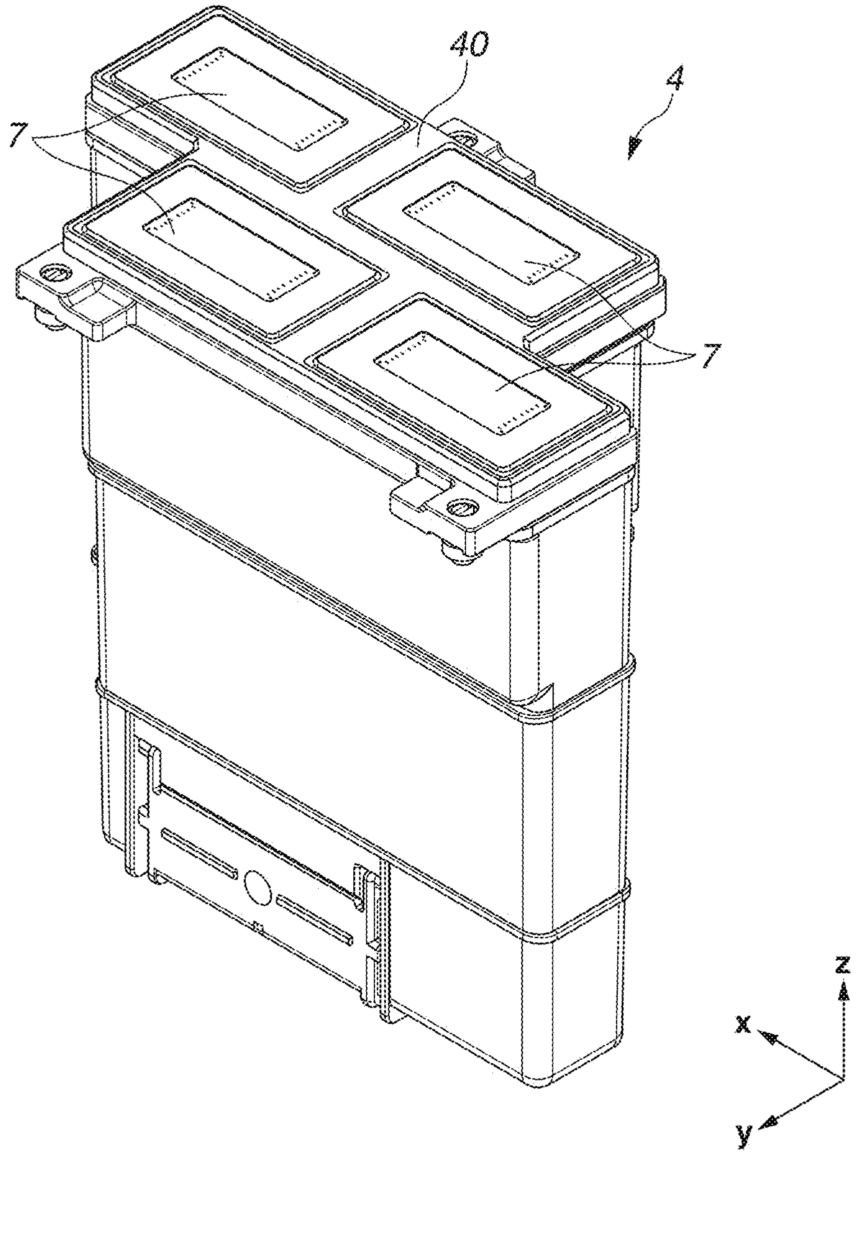
FIG. 3 is a diagram illustrating an example of a liquid ejection head of the present disclosure.
Figure 4:
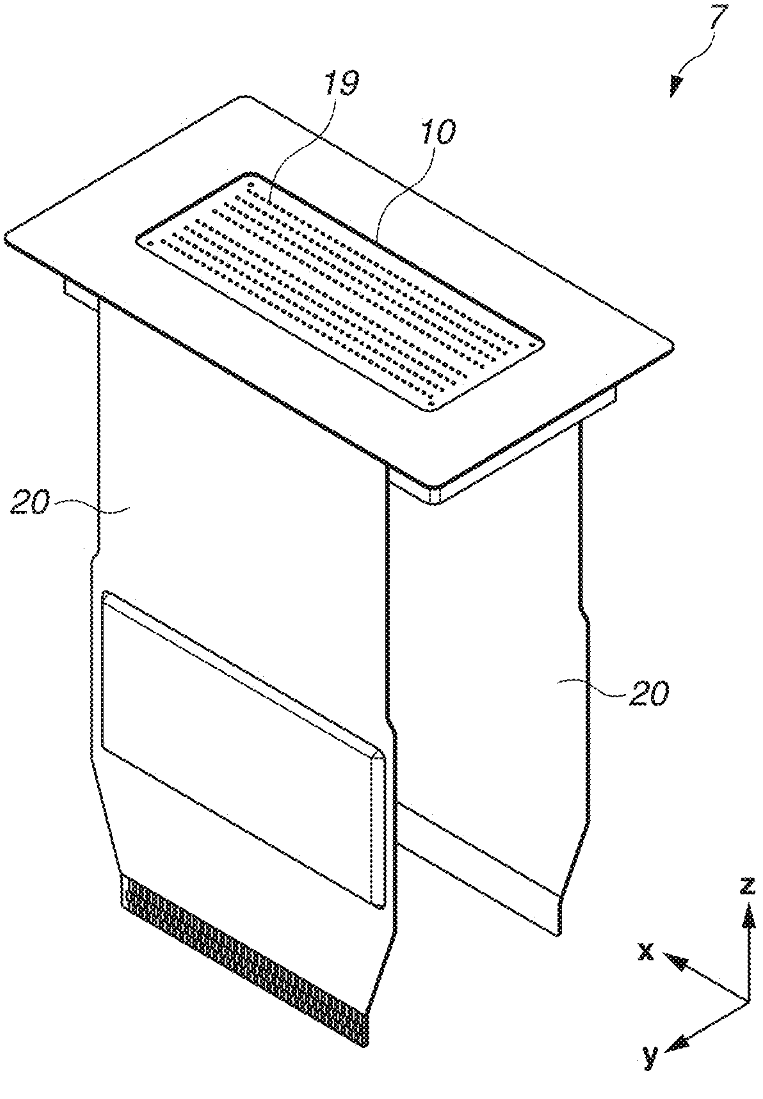
FIG. 4 is a diagram illustrating an example of a liquid ejection unit of the present disclosure.

FIG. 3 is a perspective view of the liquid ejection head 4, and FIG. 4 is a perspective view of a liquid ejection unit 7. In the liquid ejection head 4 according to the present exemplary embodiment, a plurality of liquid ejection units 7 each including an element substrate 10 having an ejection port 19 for ejecting liquid is fixed on a support member 40. The present disclosure can be suitably used even in a liquid ejection head having a configuration in which only one liquid ejection unit 7 is fixed on one support member 40.

As illustrated in FIG. 3, the liquid ejection head 4 has the plurality of liquid ejection units 7 arranged in a staggered manner. Each of the liquid ejection units 7 includes an element substrate 10 provided with the ejection port 19 and an electric wiring substrate 20, such as a flexible printed circuit board, connected to the element substrate 10. In the present exemplary embodiment, the element substrate 10 is provided with about 1000 ejection ports 19, and 1200 dots per inch (dpi) recording is possible. The electric wiring substrate 20 is configured to supply energy and electric signals for ejecting liquid to the ejection ports 19.

<Flow Path Configuration of Element Substrate>

Figure 5:
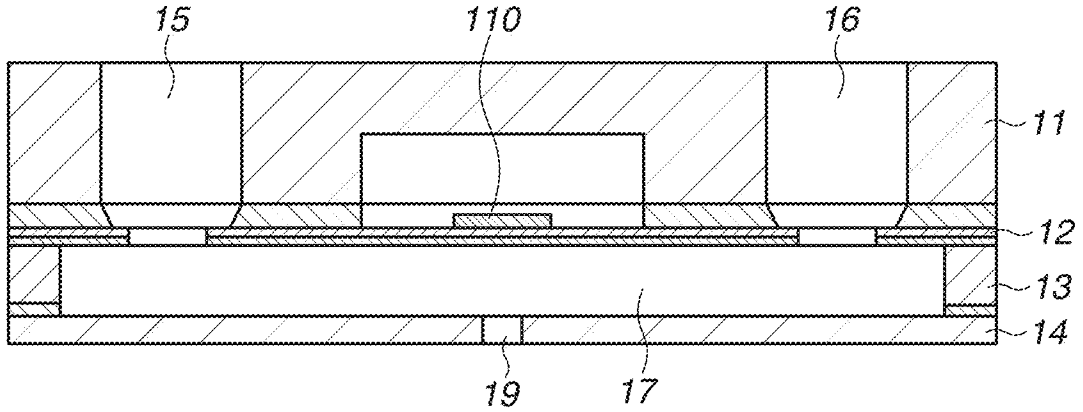
FIG. 5 is a diagram illustrating an example of an element substrate of the present disclosure.

FIG. 5 is a cross-sectional view illustrating a flow path configuration of the element substrate 10 according to the present exemplary embodiment. The element substrate 10 includes a flow path substrate 11, an actuator substrate 12, a pressure chamber substrate 13, and an ejection port substrate 14.

The flow path substrate 11 includes a supply port 15 for supplying liquid to be ejected from the ejection ports 19 to a pressure chamber 17 described below, and an outflow port 16 for allowing the liquid to flow out from the pressure chamber 17. Thus, the element substrate 10 is configured such that the liquid can be circulated between the inside and the outside of the pressure chamber 17. The piezoelectric actuator of the present disclosure can be suitably used even in a liquid ejection head having a structure in which the flow path substrate 11 does not have the outflow port 16. Further, the liquid ejection head may be configured to supply liquid to the pressure chamber 17 from both the supply port 15 and the outflow port 16 in FIG. 5. The flow path substrate 11 according to the present exemplary embodiment is formed by etching a silicon substrate, for example, using any material and manufacturing method.

The actuator substrate 12 is bonded to the flow path substrate 11. The actuator substrate 12 includes a substrate (substrate 101, see FIG. 6) and a piezoelectric element 110. A detailed configuration of the actuator substrate 12 will be described below, and the actuator substrate 12 and a piezoelectric actuator to be described below are illustrated in a simplified manner in FIG. 5.

The pressure chamber substrate 13 is bonded to a surface of the actuator substrate 12 opposite to a surface to which the flow path substrate 11 is bonded. The pressure chamber substrate 13 is provided with the pressure chamber 17 corresponding to the piezoelectric element 110. The pressure chamber substrate 13 according to the present exemplary embodiment is formed by etching a silicon substrate, for example, using any material and manufacturing method, similar to the flow path substrate 11.

The ejection port substrate 14 is bonded to a surface of the pressure chamber substrate 13 on a side opposite to the actuator substrate 12. The ejection port substrate 14 is provided with the ejection port 19. In the element substrate 10, a liquid is supplied from the supply port 15 to the pressure chamber 17, and is ejected from the ejection port 19 by driving the piezoelectric element 110 and deforming the actuator substrate 12.

A protective layer may be provided so as to cover an inner wall of a liquid flow path through which the supply port 15, the pressure chamber 17, the ejection port 19, and the outflow port 16 communicate. By forming a protective layer using a material having a higher resistance to the liquid to be ejected than silicon constituting the flow path substrate 11, the pressure chamber substrate 13, or the like on a wall surface of the flow path, an effect of improving long-term reliability of the element substrate 10 is obtained. When the flow path substrate 11 and the pressure chamber substrate 13 are each formed of a silicon substrate, the protective layer may be formed of, for example, $SiO_2$, SiC, $Al_2O_3$, $HfO_2$, TaO, or diamond-like carbon (DLC).

<Configuration of Piezoelectric Actuator>

The actuator substrate 12 will now be described in detail. Note that the constituent elements described in the following exemplary embodiments are merely examples, and the scope of the present disclosure is not intended to be limited only to these.

Figure 6:
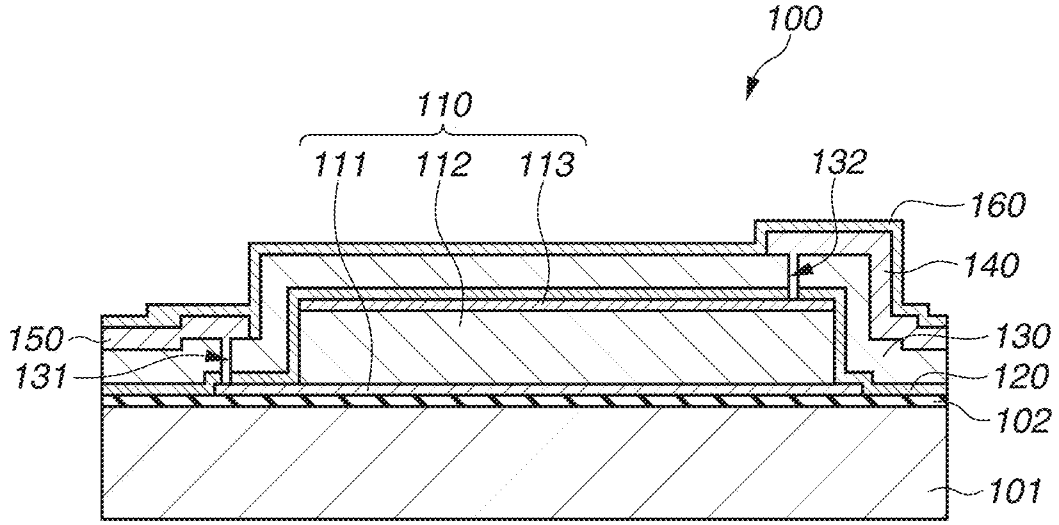
FIG. 6 is a cross-sectional view illustrating an example of a piezoelectric actuator of the present disclosure.

FIG. 6 illustrates a cross-sectional view of the piezoelectric actuator according to the present exemplary embodiment. As illustrated in FIG. 6, the actuator substrate 12 includes the piezoelectric element 110 in which a lower electrode 111, a piezoelectric layer 112, and an upper electrode 113 are formed in this order on the substrate 101. The substrate 101 together with the piezoelectric element 110 are referred to as a piezoelectric actuator 100 (hereinafter, also referred to as an actuator). As illustrated in FIG. 5, in the element substrate 10, the pressure chamber 17 is disposed on a side opposite to a surface of the substrate 101 on which the actuator 100 is disposed, and the piezoelectric layer 112 is disposed so as to overlap the pressure chamber 17 when viewed from a liquid ejection direction. The thickness of the piezoelectric layer 112 is determined from an applied voltage and piezoelectric characteristics necessary for obtaining a desired displacement amount of the actuator substrate 12, and is about 1 to 2 μm, for example, in the exemplary embodiment.

The substrate 101 constitutes one of wall surfaces of the pressure chamber 17 as illustrated in FIG. 5, and may have a flat surface. The material therefor can be selected as appropriate, and for example, a material such as silicon (Si), silicon carbide (SiC), quartz, gallium nitride (GaN), gallium arsenide (GaAs), indium phosphide (InP), or sapphire can be suitably used. In order to easily form the pressure chamber 17, the substrate 101 and the pressure chamber substrate 13 may be formed of a silicon on insulator (SOI) substrate. The SOI substrate has a silicon oxide layer (buried oxide (BOX) layer) on a silicon substrate, and further has a silicon layer thereon. The BOX layer can be formed to have the thickness of several tens of nm to several hundreds of μm, and the thickness of the silicon layer thereon can be selected relatively freely. By appropriately combining these film thicknesses and performing selective etching on the silicon substrate using the BOX layer as an etching stop layer, only silicon can be removed to form the pressure chamber 17. A bottom portion of a recessed portion obtained by such selective etching serves as a surface of the BOX layer, and an extremely flat surface can be obtained as the wall surface of the substrate 101 constituting the pressure chamber 17. In this case, the substrate 101 includes at least a silicon oxide layer derived from the BOX layer, and a silicon layer in contact with a surface of the silicon oxide layer on the side opposite to the pressure chamber 17. As described above, the substrate 101 in the piezoelectric actuator 100 may have a laminated structure.

The lower electrode 111 may be made of a material having a high melting temperature because, in some cases, the lower electrode 111 is exposed to a high temperature of several hundred degrees Celsius in a subsequent process of firing the piezoelectric layer. For example, copper, platinum, gold, chromium, cobalt, titanium, or an alloy thereof can be used. In addition, in a case where the piezoelectric layer 112 is formed so as to be in contact with a surface of the lower electrode 111, the lower electrode 111 may also serve as a film for controlling the crystal orientation of the piezoelectric layer 112. In this case, a material having an appropriate crystal structure may be appropriately selected for the lower electrode 111. For example, when lead zirconate titanate (PZT) is used as the piezoelectric layer 112, platinum can be used for the lower electrode 111 that also serves as a crystalline orientation control film. A general film formation method such as a magnetron sputtering method can be used for the film formation of platinum, and the film thickness is appropriately adjusted so that a desired orientation is obtained.

In addition, in order to improve adhesion between the lower electrode 111 and the substrate 101 which is a base film, a thin film of titanium, chromium, or the like may be further included as an adhesion layer.

The upper electrode 113 is formed on the piezoelectric layer 112 and is made of, for example, platinum, titanium, tungsten, or an alloy thereof. Similar to the lower electrode 111, in order to improve adhesion between the upper electrode 113 and the base film, a thin film of titanium, chromium, or the like may be further provided as an adhesion layer between the piezoelectric layer 112 and the upper electrode 113.

When the substrate 101 is conductive, it may be preferable to have an insulating layer 102 between the lower electrode 111 and the substrate 101. The insulating layer 102 can be formed using a general insulating material, such as silicon oxide, silicon nitride, silicon oxynitride, or aluminum oxide.

In order to apply a desired voltage between the lower electrode 111 and the upper electrode 113 and displace the piezoelectric layer 112, a lower wiring 150 is electrically connected to the lower electrode 111 and an upper wiring 140 is electrically connected to the upper electrode 113.

The lower wiring 150 and the upper wiring 140 may be made of a material generally used for electric wiring, such as aluminum, copper, gold, or an alloy thereof. In addition, for the purpose of improving adhesion of the wirings, a film of titanium or chromium may be provided between the lower wiring 150 and the film in contact with the lower wiring 150 and between the upper wiring 140 and the film in contact with the upper wiring 140.

<Protective Layer of Piezoelectric Actuator>

As illustrated in FIG. 6, the piezoelectric actuator 100 of the present disclosure includes a first protective layer 120 formed to cover the lower electrode 111, the piezoelectric layer 112, and the upper electrode 113, a second protective layer 130 formed thereon and covering the first protective layer 120 at a position overlapping at least the lower wiring 150 or the upper wiring 140, and a third protective layer 160 formed thereon when viewed from a direction perpendicular to the surface of the substrate 101.

In the present exemplary embodiment illustrated in FIG. 6, the first protective layer 120 and the second protective layer 130 have contact holes 131 and 132 for connecting the lower electrode 111 and the lower wiring 150, and the upper electrode 113 and the upper wiring 140.

A silicon oxide film that is the second protective layer 130 as an insulating layer is provided between the piezoelectric element 110 and the lower wiring 150 and between the piezoelectric element 110 and the upper wiring 140. As the second protective layer 130, a material can be appropriately selected from general insulating materials, such as silicon nitride, silicon oxynitride, and aluminum oxide, similar to the insulating layer 102. Further, the second protective layer 130 may be a laminated film in which two or more types of different films are laminated. The second protective layer 130 can be formed by a general film formation method, such as the chemical vapor deposition (CVD) method or the sputtering method. In the present exemplary embodiment, the silicon oxide film as the second protective layer 130 is formed by the CVD method because of its excellent production rate.

Figure 7:
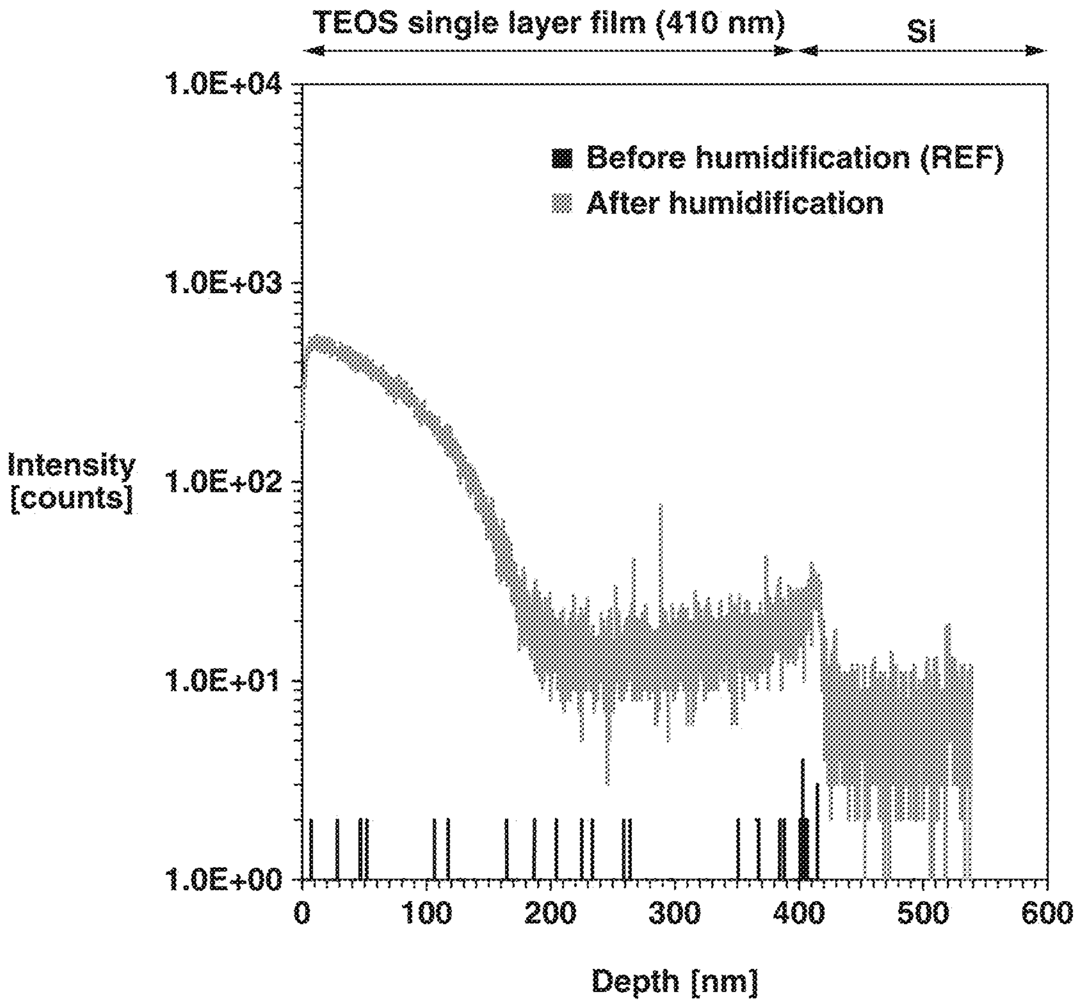
FIG. 7 is a graph illustrating a result of a moisture penetration evaluation of a silicon oxide single layer film.

In the piezoelectric actuator 100 used in the liquid ejection head 4, a potential difference that is relatively large for a semiconductor device is applied between the upper electrode 113 or the upper wiring 140 and the lower electrode 111 or the lower wiring 150 to displace the piezoelectric layer 112. In order to obtain a sufficient amount of displacement, a potential difference of approximately 30 V or more is applied to the piezoelectric layer 112 in a thickness direction. In the case where the second protective layer 130 is the silicon oxide film formed by the CVD method, the dielectric breakdown strength is about 7 MV/cm. Thus, for example, in order to obtain a dielectric strength voltage of 50 V, a failure probability can be reduced by setting the thickness of the second protective layer 130 to be more than or equal to 72 nm. Further, the second protective layer 130 also serves as a moisture-proof film for a layer thereunder (the first protective layer 120 described below). FIG. 7 is a graph illustrating a result of a moisture penetration evaluation of the silicon oxide film formed on the silicon substrate and having the thickness of 410 nm. FIG. 7 illustrates dynamic secondary ion mass spectrometry (D-SIMS) depth profiles before and after humidification, which are obtained by time-of-flight secondary ion mass spectrometry (TOF-SIMS) using heavy water ($D_2O$) as a marker. From this result, it is understood that the thickness may be more than or equal to 200 nm in order to secure moisture resistance of the silicon oxide film to the base. On the other hand, if the film thickness is too thick, displacement characteristics of the piezoelectric actuator are degraded, and thus, the film thickness of the second protective layer 130 (silicon oxide film) may be 1.5 μm or less. More specifically, the second protective layer 130 may be 200 nm or more and 1.5 μm or less in thickness.

When the silicon oxide film, which is the second protective layer 130, is formed, the piezoelectric layer 112 may be damaged, and the piezoelectric characteristics may deteriorate. Thus, as a protective layer for preventing damage to the piezoelectric layer 112, an aluminum oxide film, which is the first protective layer 120, is provided on a surface of the piezoelectric layer 112. On the other hand, a surface of aluminum oxide is altered when exposed to moisture at high temperature.

In a case where, in the middle of a manufacturing process, a process of forming the contact holes 131 and 132 and a process of forming the upper wiring 140 and the lower wiring 150 are performed in a state where aluminum oxide is exposed on the outermost surface of the piezoelectric actuator 100, a surface of the aluminum oxide film may be exposed to moisture during cleaning. Moisture remaining on the surface of the aluminum oxide film may be heated to a high temperature during etching or ashing, which may cause the aluminum oxide film surface to be altered. The presence of the altered aluminum oxide film on the piezoelectric layer may lead to a deterioration in dielectric strength and may cause a failure. Therefore, it may be preferable that the silicon oxide film, which is the second protective layer 130, be formed in contact with the aluminum oxide film, which is the first protective layer 120, so as to cover the aluminum oxide film.

The film thickness of the first protective layer 120 may be the minimum necessary thickness from the viewpoint of reducing an influence on the displacement characteristics of the piezoelectric body and forming the contact holes. In particular, the thickness may be 50 nm or less, and may be 25 nm or less. In order to obtain a dielectric strength voltage of 50 V or more, for example, the aluminum oxide film may be formed to have a thickness of 5 nm or more in consideration of a step coverage property with regard to the piezoelectric layer 112 having a thickness of μm order. More specifically, the thickness of the first protective layer 120 may be more than or equal to 5 nm and less than or equal to 50 nm, and may be more than or equal to 5 nm and less than or equal to 25 nm. As described above, in the piezoelectric actuator 100 used in the liquid ejection head 4, a relatively high voltage is applied to obtain a sufficient amount of displacement for ejecting liquid, and a surface density of the piezoelectric elements 110 on the element substrate 10 is high in a case where the ejection ports are densely arranged. Under such conditions, in a high humidity environment where ink is ejected, a current may flow on the surface of the piezoelectric actuator, which may lead to a failure. In the piezoelectric actuator used in a liquid ejection head for ejecting liquid, such as ink, the presence of liquid exerts a large influence on the piezoelectric actuator in particular. Thus, the upper wiring 140 and the lower wiring 150 are covered with the third protective layer 160 as a passivation film having the high moisture resistance and insulation properties. As the third protective layer 160, a silicon oxide film, a silicon nitride film, a silicon oxynitride film, or the like can be used. In particular, a passivation film partially including the silicon nitride film may be used because such passivation film has the higher moisture resistance than that of a silicon oxide film and can provide the sufficient moisture resistance and insulation properties even if the film thickness is thin compared with that in a case where the passivation film is formed of the silicon oxide film. Thus, it is unlikely to adversely affect the displacement characteristics of the piezoelectric actuator. In other words, the third protective layer 160 may have the higher moisture resistance than that of the second protective layer 130. The moisture resistance of the two layers may be compared by using a moisture resistance evaluation method generally used, such as the above-described moisture penetration evaluation. In addition, from a viewpoint of insulation properties, it may be desirable that the third protective layer 160 is disposed so as to cover at least the lower wiring 150, the upper wiring 140, and the periphery of the piezoelectric layer 112 in the plan view. The film thickness of the third protective layer 160 may be the minimum necessary thickness from the viewpoint of reducing an influence on the displacement characteristics of the piezoelectric body and forming the contact holes. On the other hand, in the piezoelectric actuator 100 of the present disclosure, in order to prevent the displacement characteristics from being impaired, the piezoelectric layer cannot be filled with an insulating layer or the like, and the upper and lower wirings formed thereon cannot be planarized by a chemical mechanical polishing method (CMP method) or the like. Thus, since the shapes of the upper wiring 140 and the lower wiring 150 inherit a stepped shape caused by the piezoelectric element 110, the film thickness of the third protective layer 160 needs to be a thickness in consideration of the step coverage property with regard to the piezoelectric layer 112 and the upper wiring 140 and lower wiring 150. In the present exemplary embodiment, as an example, a silicon nitride film having a thickness of 200 nm is provided as the third protective layer 160 so as to sufficiently cover the piezoelectric layer 112 having a thickness of 2 μm and the lower wiring 150 and the upper wiring 140 having a thickness of 700 nm.

As described above, the piezoelectric actuator 100 of the present disclosure includes the first protective layer 120, the second protective layer 130, and the third protective layer 160 described above, and thus it is possible to obtain the effects of preventing the deterioration in characteristics of the piezoelectric layer due to moisture and suppressing the dielectric breakdown or the failure due to an increase in leakage current.

<Method for Manufacturing Piezoelectric Actuator>

Figure 8A:
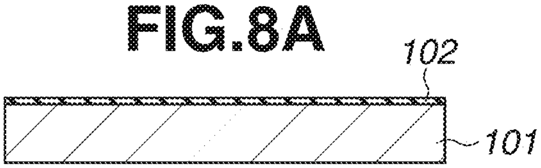
FIGS. 8A, 8B, 8C, 8D, 8E, 8F, 8G, 8H, and 8I are cross-sectional views each illustrating a part of a manufacturing process of the piezoelectric actuator of the present disclosure.

A method of manufacturing the piezoelectric actuator 100 of the present disclosure will be described with reference to FIGS. 8A to 8I. First, as illustrated in FIG. 8A, the substrate 101 made of silicon is prepared, and a silicon thermal oxide film having a thickness of about 500 nm is formed as the insulating layer 102 by a wet oxidation method using oxygen and a hydrogen gas.

Figure 8B:
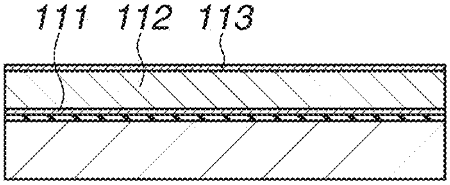

Subsequently, as illustrated in FIG. 8B, the lower electrode 111, the piezoelectric layer 112, and the upper electrode 113 are formed on the insulating layer 102 in this order.

The lower electrode 111 can be formed by, for example, a sputtering method. When the material of the piezoelectric layer 112 is lead zirconate titanate (PZT), platinum may preferably be used for the lower electrode 111 that also serves as the crystalline orientation control film. In the present exemplary embodiment, as an example, a platinum film having a thickness of 100 nm is formed. A thin film of titanium, chromium, or the like may be formed as an adhesion layer for improving adhesion between the lower electrode 111 and the insulating layer 102.

In the formation of the piezoelectric layer 112, a sol-gel method is used. A primary material, such as a sol-gel liquid, is applied onto the lower electrode 111 and fired so as to have a desired crystalline orientation. In the present exemplary embodiment, as an example, a PZT film having a thickness of 2 μm is formed.

Subsequently, the upper electrode 113 is formed by a sputtering method or the like. In the present exemplary embodiment, an alloy film of titanium and tungsten having a thickness of about 100 nm is formed as an example.

Figure 8C:
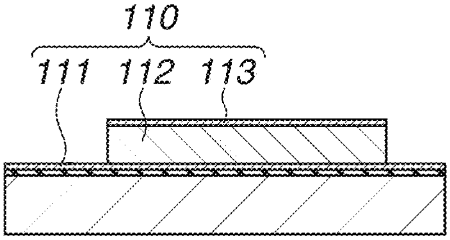

Subsequently, a resist pattern (not illustrated) is formed by a photolithography method so that the upper electrode 113 and the piezoelectric layer 112 have a desired pattern. Then, as illustrated in FIG. 8C, the upper electrode 113 and the piezoelectric layer 112 are patterned by etching.

Figure 8D:
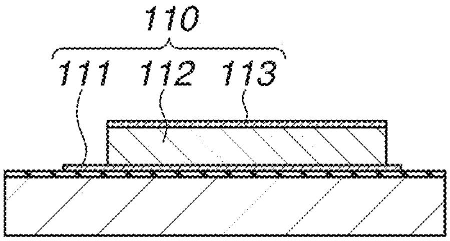

Subsequently, a resist pattern (not illustrated) is formed by a photolithography method so that the lower electrode 111 has a desired pattern. Then, as illustrated in FIG. 8D, the lower electrode 111 is patterned by etching. Through the above steps, the piezoelectric element 110 including the lower electrode 111, the piezoelectric layer 112, and the upper electrode 113 is formed.

Figure 8E:
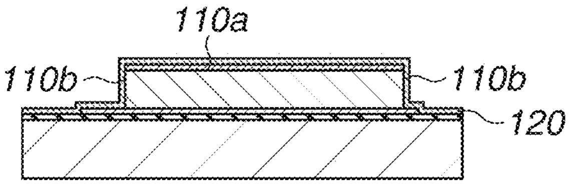

Subsequently, as illustrated in FIG. 8E, the aluminum oxide film as the first protective layer 120 is formed so as to cover at least an upper surface 110*a* and side surfaces 110*b* of the piezoelectric element 110, the lower electrode 111, and the upper electrodes 113. In the present exemplary embodiment, the first protective layer 120 having a thickness of 23 nm, for example, is formed by using an atomic layer deposition method (ALD method).

Figure 8F:
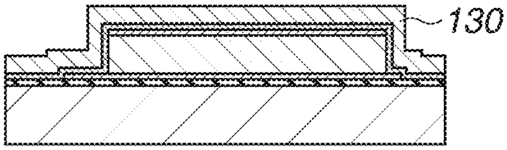

Subsequently, as illustrated in FIG. 8F, the silicon oxide film as the second protective layer 130 is formed so as to cover the aluminum oxide film (first protective layer 120). In the present exemplary embodiment, the thickness of the second protective layer 130 is 400 nm, for example.

Figure 8G:
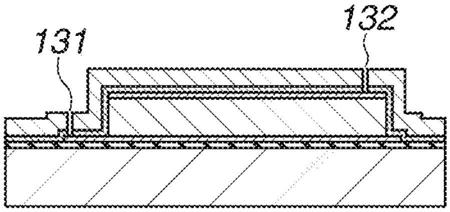

Next, as illustrated in FIG. 8G, an upper through hole 132 and a lower through hole 131, which serve as contact holes 132 and 131, are formed by a photolithography method. A resist pattern (not illustrated) for forming the through holes serving as contact holes in the first protective layer 120 and the second protective layer 130 is formed on the second protective layer 130, and then etching is performed to form the upper through hole 132 and the lower through hole 131.

Figure 8H:
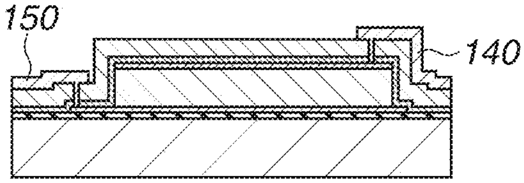

Subsequently, as illustrated in FIG. 8H, wiring materials to be the upper wiring 140 and the lower wiring 150 are formed on the second protective layer 130 by a sputtering method. Thereafter, the wiring materials are patterned by a photolithography method using resist patterns to form the upper wiring 140 and the lower wiring 150. In the present exemplary embodiment, as an example, an aluminum alloy is used as the wiring materials, and the thickness of the wiring materials is 600 nm.

Figure 8I:
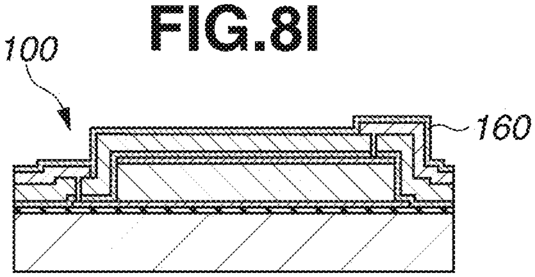

Subsequently, as illustrated in FIG. 8I, the silicon nitride film as the third protective layer 160 having the higher moisture resistance than that of the second protective layer 130 (silicon oxide film) is formed so as to cover the upper wiring 140 and the lower wiring 150. The CVD method is used, and the third protective layer 160 having a thickness of 200 nm, for example, is used in the present exemplary embodiment.

The piezoelectric actuator 100 is formed by etching the third protective layer 160 into a desired pattern by the photolithography method using a resist pattern.

Thereafter, a pressure chamber substrate and an ejection port substrate having a pressure chamber, an ejection port, and the like, a flow path substrate having a flow path for supplying liquid to the pressure chamber, and the like are prepared, and are bonded to the piezoelectric actuator 100, thereby producing a liquid ejection head (see FIG. 5).

As described above, by using the piezoelectric actuator of the present disclosure, it is possible to provide the liquid ejection head 4 in which the deterioration in characteristics of the piezoelectric layer due to moisture is prevented and the dielectric breakdown or the failure due to an increase in leakage current are suppressed.

In the following exemplary embodiments, descriptions will be provided focusing on differences from the first exemplary embodiment described above, and descriptions of the same parts as the configurations described above will be omitted.

Figure 9:
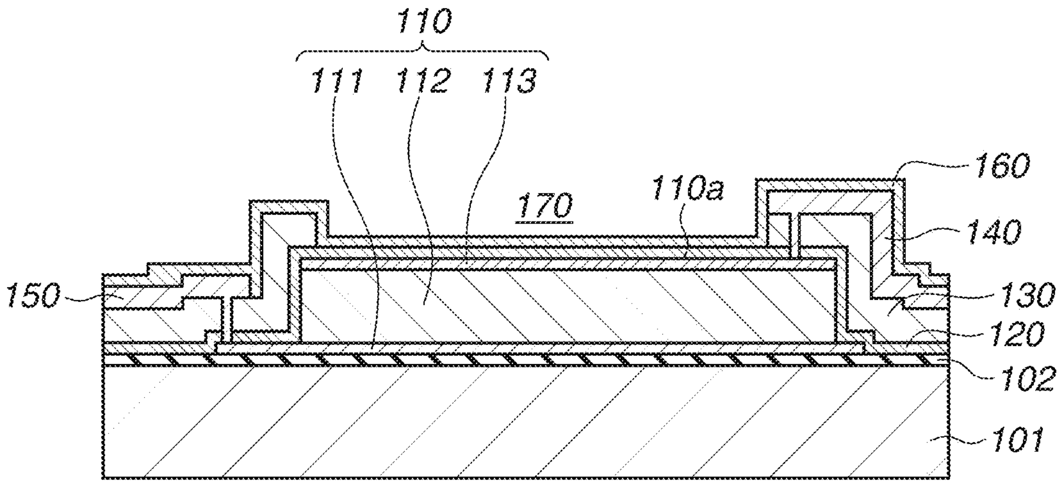
FIG. 9 is a cross-sectional view illustrating an example of a piezoelectric actuator of the present disclosure.

A second exemplary embodiment of the present disclosure will be described with reference to FIG. 9. In the present exemplary embodiment, a piezoelectric actuator 100 has a recessed portion 170 where a silicon oxide film that is the second protective layer 130 is interrupted on the upper surface 110*a* of the piezoelectric element 110. More specifically, the second protective layer 130 has an opening in a region overlapping the piezoelectric layer 112 when viewed from the direction perpendicular to the surface of the substrate 101. Since the second protective layer 130 is partially removed on the upper surface 110*a* of the piezoelectric element 110, the rigidity of the piezoelectric actuator can be reduced. This makes it possible to drive the piezoelectric actuator with a voltage lower than that in the first exemplary embodiment, and thus an effect of the improved driving efficiency of the piezoelectric actuator can be obtained. On the other hand, the second protective layer 130 is disposed at a position where leakage is likely to occur, specifically, between a lower electrode and a lower wiring, between a lower electrode or an upper electrode and an upper wiring, and at a position overlapping with the periphery of the piezoelectric layer 112 when viewed from the direction perpendicular to the surface of the substrate 101. Therefore, even in the configuration according to the present exemplary embodiment, it is possible to sufficiently obtain the effect of the present disclosure that the deterioration in characteristics of the piezoelectric layer due to moisture or the dielectric breakdown due to an increase in leakage current are unlikely to occur.

Note that the second protective layer 130 may be configured to be recessed in the direction perpendicular to the surface of the substrate 101 to form the recessed portion 170, instead of being opened.

In manufacturing the piezoelectric actuator according to the present exemplary embodiment, in the step of forming the upper through hole 132 and the lower through hole 131 by etching illustrated in FIG. 8G, the recessed portion 170 can be formed by simultaneously etching at least a part of a central portion of the second protective layer 130 on the upper surface 110*a* of the piezoelectric element 110. The recessed portion 170 may be formed after the step of forming the upper wiring 140 and the lower wiring 150 illustrated in FIG. 8H.

The recessed portion 170 may be formed by recessing or opening the third protective layer 160, instead of the second protective layer 130, in a region overlapping the piezoelectric layer 112. However, it may be desirable to reduce the rigidity of the piezoelectric actuator by partially removing the second protective layer 130 rather than the third protective layer 160 having higher moisture resistance than the second protective layer 130, from a viewpoint of ensuring the moisture resistance of the piezoelectric layer 112.

Figure 10:
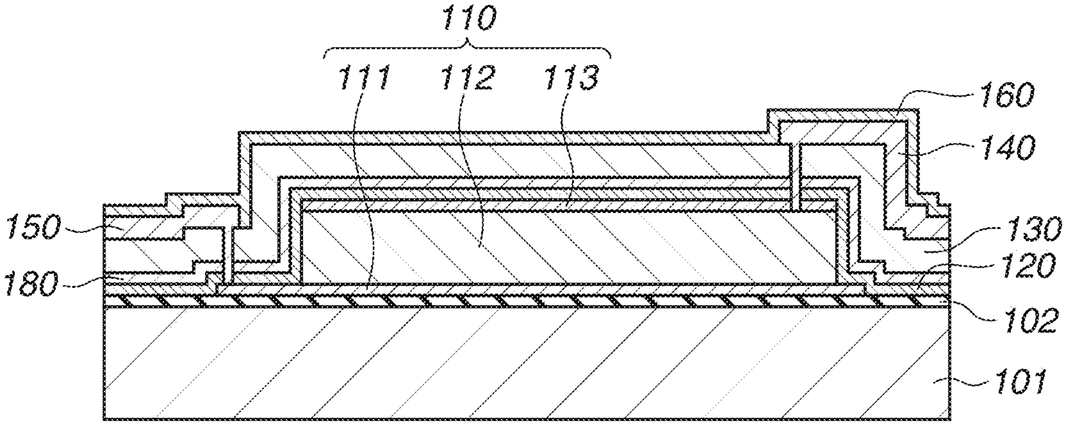
FIG. 10 is a cross-sectional view illustrating an example of a piezoelectric actuator of the present disclosure.

A third exemplary embodiment of the present disclosure will be described with reference to FIG. 10. In the present exemplary embodiment, a piezoelectric actuator 100 further includes a fourth protective layer (fourth layer) 180 formed to cover the first protective layer 120. The fourth protective layer 180 may have higher moisture resistance than the first protective layer 120, and thus, it is possible to further prevent the characteristics of the piezoelectric layer 112 from being deteriorated due to moisture. In the present exemplary embodiment, as an example, a hafnium oxide film having higher moisture resistance than the aluminum oxide film that is the first protective layer 120 is provided as the fourth protective layer 180. The fourth protective layer 180 is not limited to the hafnium oxide film, and may be any film as long as it has a higher moisture-proof property than the aluminum oxide film. In FIG. 10, the first protective layer 120 and the fourth protective layer 180 are each formed of a single layer, but each may be formed of a laminate of two kinds of layers. For example, a laminated film in which an aluminum oxide film having a thickness of 5 nm as the first protective layer 120 and a hafnium oxide film having a thickness of 5 nm as the fourth protective layer 180 are alternately laminated in plural layers is considered. In the case of such a laminated structure, compared to the case of a single layer film, even when a pinhole or the like is present in a certain layer, it is possible to further secure the moisture resistance with respect to the piezoelectric layer 112.

Figure 11:
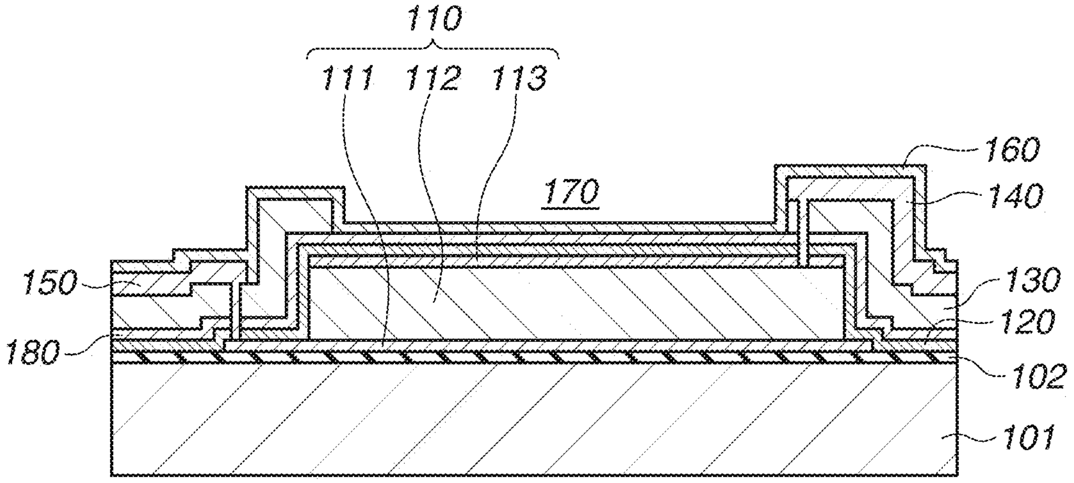
FIG. 11 is a cross-sectional view illustrating an example of a piezoelectric actuator of the present disclosure.

A fourth exemplary embodiment of the present disclosure will be described with reference to FIG. 11. In the present exemplary embodiment, a piezoelectric actuator 100 has a recessed portion 170 where the silicon oxide film that is the second protective layer 130 is interrupted on the upper surface 110*a* of the piezoelectric element 110, and further includes the fourth protective layer 180 formed so as to cover the first protective layer 120. More specifically, the configuration is a combination of the second exemplary embodiment and the third exemplary embodiment described above.

By including the fourth protective layer 180 having the higher moisture resistance than the first protective layer 120, even when the recessed portion 170 for improving driving characteristics of the piezoelectric actuator 100 is formed, the effect of preventing the characteristics of the piezoelectric layer 112 from being deteriorated due to moisture can be sufficiently obtained. In FIG. 11, the first protective layer 120 and the fourth protective layer 180 are each formed of a single layer, but each may be formed of a laminate as described in the third exemplary embodiment.

Figure 12:
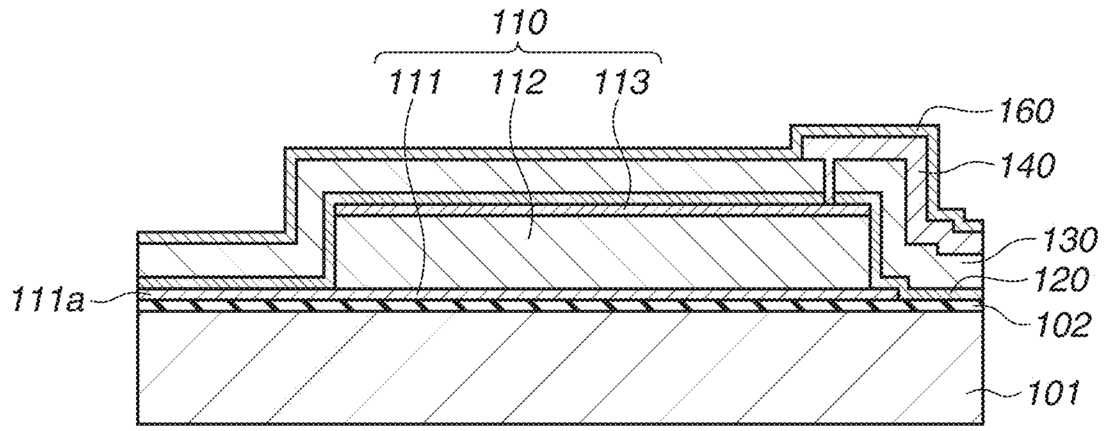
FIG. 12 is a cross-sectional view illustrating an example of a piezoelectric actuator of the present disclosure.

A fifth exemplary embodiment of the present disclosure will be described with reference to FIG. 12. In the present exemplary embodiment, the lower electrode 111 is formed to also serve as a lower wiring. In this case, it is possible to obtain an effect of reducing the number of steps of forming a contact hole for connecting the lower electrode and the lower wiring and the number of steps of forming the lower wiring. An aluminum oxide film as the first protective layer 120, a silicon oxide film as the second protective layer 130, and a silicon nitride film as the third protective layer 160 are formed on a portion 111*a* of the lower electrode 111 that serves as the lower wiring. The film thickness of each layer is the same as that of the first exemplary embodiment. Even in a piezoelectric actuator having a structure in which the lower electrode 111 also serves as the lower wiring and the lower electrode 111 is integrally formed with the lower wiring as in the present exemplary embodiment, it is possible to provide a liquid ejection head that does not cause the deterioration in characteristics of the piezoelectric layer due to moisture, or the dielectric breakdown or the failure due to an increase in leakage current by suitably using the present disclosure.

Figure 13:
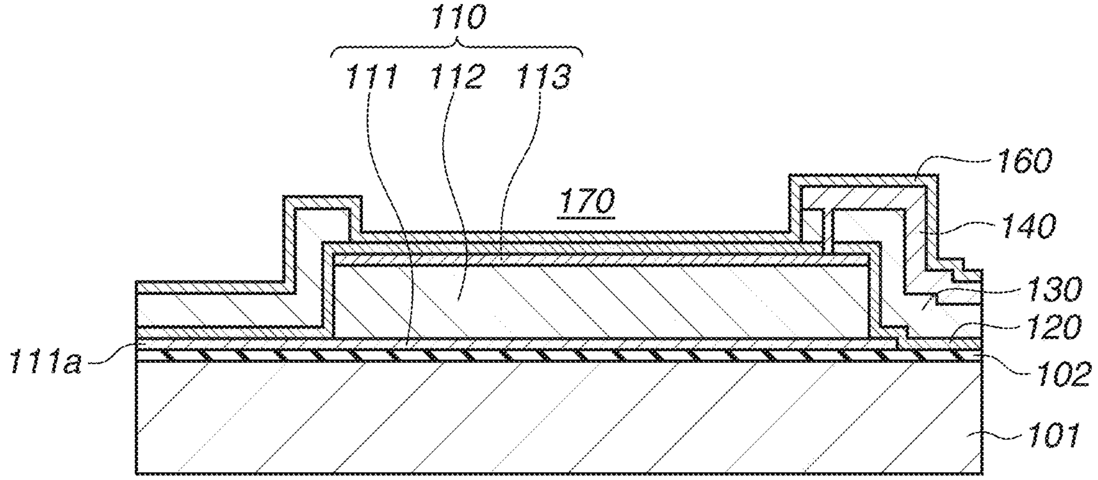
FIG. 13 is a cross-sectional view illustrating an example of a piezoelectric actuator of the present disclosure.

A sixth exemplary embodiment of the present disclosure will be described with reference to FIG. 13. In the present exemplary embodiment, the lower electrode 111 is formed to also serve as the lower wiring, as in the fifth exemplary embodiment. Further, as in the second exemplary embodiment, a piezoelectric actuator 100 has the recessed portion 170 where the silicon oxide film that is the second protective layer 130 is interrupted on the upper surface 110*a* of the piezoelectric element 110. In other words, the configuration is a combination of the fifth exemplary embodiment and the second exemplary embodiment described above.

Figure 14:
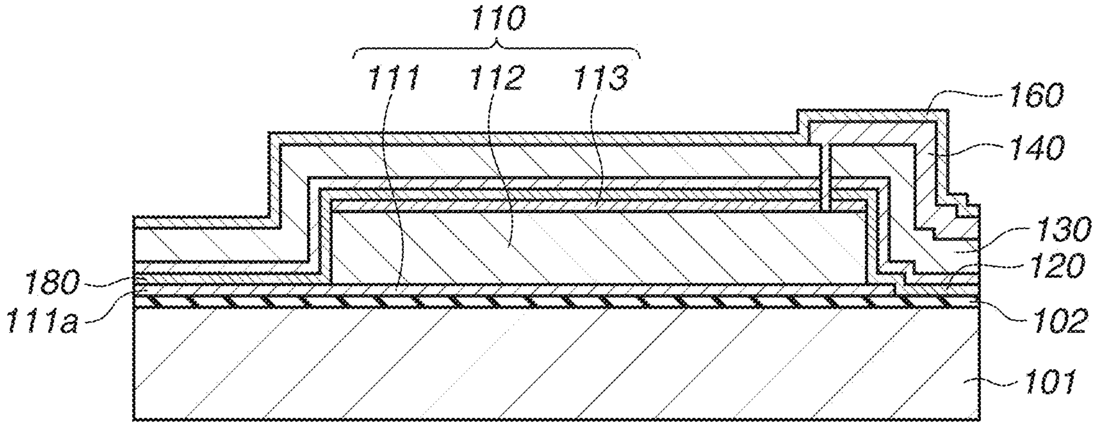
FIG. 14 is a cross-sectional view illustrating an example of a piezoelectric actuator of the present disclosure.

A seventh exemplary embodiment of the present disclosure will be described with reference to FIG. 14. In the present exemplary embodiment, the lower electrode 111 is formed to also serve as the lower wiring, as in the fifth exemplary embodiment. A piezoelectric actuator 100 further includes the fourth protective layer 180 formed to cover the first protective layer 120. In other words, the configuration is a combination of the fifth exemplary embodiment and the third exemplary embodiment described above.

Figure 15:
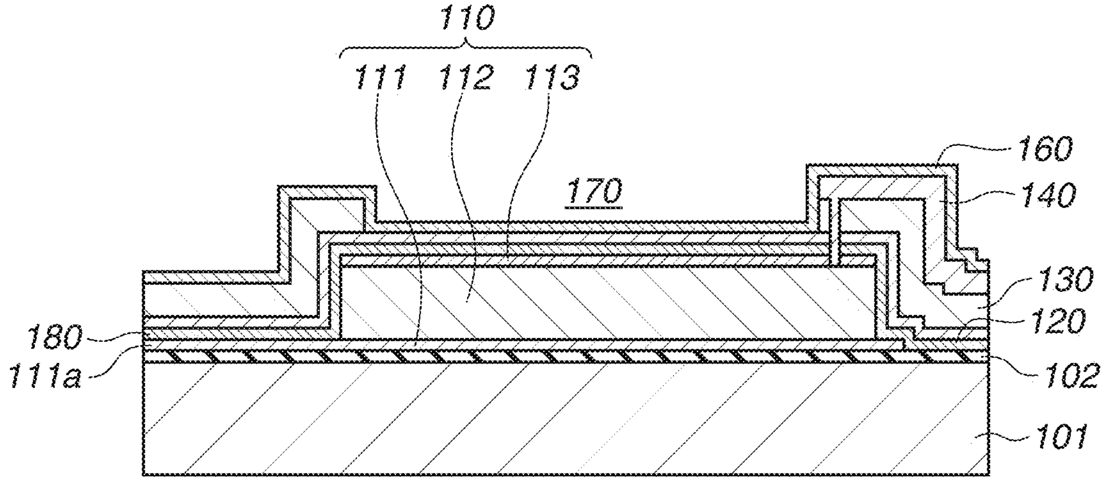
FIG. 15 is a cross-sectional view illustrating an example of a piezoelectric actuator of the present disclosure.

An eighth exemplary embodiment of the present disclosure will be described with reference to FIG. 15. In the present exemplary embodiment, the lower electrode 111 is formed to also serve as a lower wiring, as in the fifth exemplary embodiment. Further, as in the second exemplary embodiment, a piezoelectric actuator 100 has the recessed portion 170 where the silicon oxide film that is the second protective layer 130 is interrupted on the upper surface 110*a* of the piezoelectric element 110. In addition, as in the third exemplary embodiment, the piezoelectric actuator 100 further includes the fourth protective layer 180 formed to cover the first protective layer 120. In other words, the configuration is a combination of the fifth exemplary embodiment, the second exemplary embodiment, and the third exemplary embodiment described above.

Other Exemplary Embodiments

Even in a configuration in which the exemplary embodiments of the present disclosure described above are appropriately combined, the effects of the present disclosure can be obtained.

According to the present disclosure, it is possible to provide a piezoelectric actuator having both good piezoelectric characteristics and high reliability in preventing a deterioration in dielectric strength and a failure.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-069080, which was filed on Apr. 20, 2023 and which is hereby incorporated by reference herein in its entirety.

What is claimed is:

1. A piezoelectric actuator comprising:
a piezoelectric element including a first electrode, a piezoelectric layer, and a second electrode arranged in this order from a substrate;
a first wiring electrically connected to the first electrode;
a second wiring electrically connected to the second electrode;
a first layer covering the piezoelectric element;
a second layer arranged between the piezoelectric element and the first wiring and between the piezoelectric element and the second wiring; and
a third layer arranged to cover the first wiring, the second wiring, and a periphery of the piezoelectric layer when viewed from a direction perpendicular to a surface of the substrate, wherein, within an outer perimeter of the third layer, the third layer is uninterrupted,
wherein the first layer, the second layer, and the third layer are arranged in this order from the substrate, and
wherein the third layer has higher moisture resistance than the second layer.

2. The piezoelectric actuator according to claim 1, wherein the second layer has a recessed portion or an opening in a region overlapping the piezoelectric layer when viewed from the direction perpendicular to the surface of the substrate.

3. The piezoelectric actuator according to claim 1, wherein the second layer is arranged to cover the piezoelectric layer when viewed from the direction perpendicular to the surface of the substrate.

4. The piezoelectric actuator according to claim 1, wherein a thickness of the first layer is more than or equal to 5 nm and less than or equal to 50 nm.

5. The piezoelectric actuator according to claim 1, wherein a thickness of the first layer is more than or equal to 5 nm and less than or equal to 25 nm.

6. The piezoelectric actuator according to claim 1, wherein a thickness of the second layer is more than or equal to 200 nm and less than or equal to 1.5 μm.

7. The piezoelectric actuator according to claim 1, wherein the third layer contains silicon nitride.

8. The piezoelectric actuator according to claim 1, wherein the first layer is made of aluminum oxide.

9. The piezoelectric actuator according to claim 1, wherein the first layer is made of aluminum oxide, and the second layer is made of silicon oxide.

10. The piezoelectric actuator according to claim 1, further comprising a fourth layer arranged in contact with the first layer and to cover the first layer when viewed from the direction perpendicular to the surface of the substrate.

11. The piezoelectric actuator according to claim 10, wherein the first layer and the fourth layer are alternately stacked a plurality of times.

12. The piezoelectric actuator according to claim 1, wherein the first electrode and the first wiring are integrally formed as a same layer.

13. A liquid ejection head comprising:
a piezoelectric element including a first electrode, a piezoelectric layer, and a second electrode arranged in this order from a substrate;
a first wiring electrically connected to the first electrode;
a second wiring electrically connected to the second electrode;
a first layer covering the piezoelectric element;
a second layer arranged between the piezoelectric element and the first wiring and between the piezoelectric element and the second wiring; and
a third layer arranged to cover the first wiring, the second wiring, and a periphery of the piezoelectric layer when viewed from a direction perpendicular to a surface of the substrate, the third layer having higher moisture resistance than the second layer,
wherein, within an outer perimeter of the third layer, the third layer is uninterrupted, and
wherein the first layer, the second layer, and the third layer are arranged in this order from the substrate.

14. The liquid ejection head according to claim 13, further comprising:
an ejection port for ejecting liquid; and
a pressure chamber for supplying liquid to the ejection port,
wherein the substrate constitutes one of wall surfaces of the pressure chamber.

15. The liquid ejection head according to claim 14, wherein the liquid ejection head ejects ink as the liquid.

16. A piezoelectric actuator comprising:
a piezoelectric element including a first electrode, a piezoelectric layer, and a second electrode arranged in this order from a substrate;
a first wiring electrically connected to the first electrode;
a second wiring electrically connected to the second electrode;
a first layer covering the piezoelectric element;
a second layer arranged between the piezoelectric element and the first wiring and between the piezoelectric element and the second wiring; and a third layer arranged to cover the first wiring, the second wiring, and a periphery of the piezoelectric layer when viewed from a direction perpendicular to a surface of the substrate, wherein the second layer is formed in contact with the first layer, wherein the second layer covers at least a portion of the first layer that is in contact with a side surface of the piezoelectric layer such that the portion of the first layer is not exposed at an outer surface of the piezoelectric actuator, wherein the first layer, the second layer, and the third layer are arranged in this order from the substrate, and wherein the third layer has higher moisture resistance than the second layer.

17. A liquid ejection head comprising:

a piezoelectric element including a first electrode, a piezoelectric layer, and a second electrode arranged in this order from a substrate;

a first wiring electrically connected to the first electrode;

a second wiring electrically connected to the second electrode;

a first layer covering the piezoelectric element;

a second layer arranged between the piezoelectric element and the first wiring and between the piezoelectric element and the second wiring; and a third layer arranged to cover the first wiring, the second wiring, and a periphery of the piezoelectric layer when viewed from a direction perpendicular to a surface of the substrate, the third layer having higher moisture resistance than the second layer, wherein the second layer is formed in contact with the first layer, wherein the second layer covers at least a portion of the first layer that is in contact with a side surface of the piezoelectric layer such that the portion of the first layer is not exposed at an outer surface of the piezoelectric actuator, and wherein the first layer, the second layer, and the third layer are arranged in this order from the substrate.

* * * * *